US010348598B2

(12) United States Patent
Kawakami et al.

(10) Patent No.: US 10,348,598 B2
(45) Date of Patent: Jul. 9, 2019

(54) INFORMATION PROCESSING TO CONTROL POLLING FOR SHORT RANGE WIRELESS COMMUNICATION

(71) Applicant: SONY CORPORATION, Tokyo (JP)

(72) Inventors: Daisuke Kawakami, Kanagawa (JP); Sho Amano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/907,721

(22) PCT Filed: Jun. 30, 2014

(86) PCT No.: PCT/JP2014/067425
§ 371 (c)(1),
(2) Date: Jan. 26, 2016

(87) PCT Pub. No.: WO2015/025619
PCT Pub. Date: Feb. 26, 2015

(65) Prior Publication Data
US 2016/0165383 A1    Jun. 9, 2016

(30) Foreign Application Priority Data

Aug. 20, 2013  (JP) .................................. 2013-170444

(51) Int. Cl.
*H04L 12/26*       (2006.01)
*H04B 5/02*        (2006.01)
(Continued)

(52) U.S. Cl.
CPC ........... *H04L 43/10* (2013.01); *H04B 5/0031* (2013.01); *H04B 5/02* (2013.01); *H04L 67/18* (2013.01);
(Continued)

(58) Field of Classification Search
CPC ......... H04H 20/59; H04H 20/72; H04W 4/06; H04W 4/22; H04W 4/80; H04W 52/0229;
(Continued)

(56) References Cited

U.S. PATENT DOCUMENTS 6,526,034 B1 * 2/2003 Gorsuch ............... H04W 48/18
370/333
8,909,150 B2 * 12/2014 Bacioccola ....... H04M 1/72533
455/41.2
(Continued)

FOREIGN PATENT DOCUMENTS

JP  2005-303697 A   10/2005
JP  2008-228125      9/2008
(Continued)

OTHER PUBLICATIONS

Extended European Search Report of EP Patent Application No. 14838554.5, dated Mar. 2, 2017, 07 pages.
(Continued)

*Primary Examiner* — Andrew Wendell
*Assistant Examiner* — Maryam Soltanzadeh
(74) *Attorney, Agent, or Firm* — Chip Law Group

(57) ABSTRACT

Provided is a terminal device including an acquisition unit configured to acquire a result of determination of whether another terminal device that has a function for short range wireless communication is positioned near the terminal device and a control unit configured to, on the basis of the result of the determination, control a time interval of polling related to the short range wireless communication.

18 Claims, 11 Drawing Sheets

(51) Int. Cl.
  *H04W 8/00* (2009.01)
  *H04B 5/00* (2006.01)
  *H04W 52/02* (2009.01)
  *H04L 29/08* (2006.01)
  *H04L 29/06* (2006.01)
  *H04W 4/80* (2018.01)
  *H04W 84/12* (2009.01)

(52) U.S. Cl.
  CPC .............. *H04L 69/18* (2013.01); *H04L 69/28* (2013.01); *H04W 4/80* (2018.02); *H04W 8/005* (2013.01); *H04W 52/0229* (2013.01); *H04W 84/12* (2013.01); *Y02D 70/142* (2018.01); *Y02D 70/164* (2018.01); *Y02D 70/166* (2018.01); *Y02D 70/168* (2018.01); *Y02D 70/21* (2018.01); *Y02D 70/42* (2018.01)

(58) Field of Classification Search
  CPC ...... H04W 8/005; H04W 84/12; H04L 43/10; H04L 67/18; H04L 69/28; H04L 69/18; H04B 5/0031; H04B 5/02; Y02D 70/166; Y02D 70/164; Y02D 70/21; Y02D 70/142; Y02D 70/42; Y02D 70/168
  See application file for complete search history.

(56) References Cited

U.S. PATENT DOCUMENTS

| | | | |
|---|---|---|---|
| 2002/0135807 A1* | 9/2002 | Idehara | H04N 1/00127 358/1.15 |
| 2009/0248115 A1* | 10/2009 | Corndorf | A61N 1/37252 607/60 |
| 2009/0318080 A1 | 12/2009 | Takagi | |
| 2012/0001751 A1* | 1/2012 | Baker | H04W 76/10 340/539.12 |
| 2012/0131184 A1* | 5/2012 | Luna | H04W 28/14 709/224 |
| 2012/0139358 A1* | 6/2012 | Teggatz | H01F 38/14 307/104 |
| 2013/0017787 A1 | 1/2013 | Eshita | |
| 2013/0143499 A1 | 6/2013 | Ando et al. | |
| 2013/0244578 A1 | 9/2013 | Bacioccola | |
| 2013/0324036 A1 | 12/2013 | Hillan et al. | |
| 2014/0287836 A1* | 9/2014 | Chan | H04L 67/1095 463/40 |

FOREIGN PATENT DOCUMENTS

| | | |
|---|---|---|
| JP | 2008-228125 A | 9/2008 |
| JP | 2010-010763 | 1/2010 |
| JP | 2010-010763 A | 1/2010 |
| JP | 2011-124877 | 6/2011 |
| JP | 2011-124877 A | 6/2011 |
| JP | 2012-169779 | 9/2012 |
| JP | 2012-227576 | 11/2012 |
| JP | 2012-227576 A | 11/2012 |

OTHER PUBLICATIONS

Office Action for JP Patent Application No. 2015-532755, dated Apr. 17, 2018, 05 pages of Office Action and 03 pages of English Translation.

* cited by examiner

FIG.3

| Value | Configuration Method |
|---|---|
| 0x0001 | USBA (Flash Drive) |
| 0x0002 | Ethernet |
| 0x0004 | Label |
| 0x0008 | Display |
| 0x0010 | External NFC Token |
| 0x0020 | Integrated NFC Token |
| 0x0040 | NFC Interface |
| 0x0080 | PushButton |
| 0x0100 | Keypad |
| 0x0280 | Virtual Push Button |
| 0x0480 | Physical Push Button |
| 0x2008 | Virtual Display PIN |
| 0x4008 | Physical Display PIN |

FIG.4

| ADDRESS OF NFC SUPPORTING DEVICE | TIMEOUT FLAG |
|---|---|
| 00:01:02:03:04:01 | 1 |
| 00:01:02:03:04:02 | 1 |
| 00:01:02:03:04:03 | 0 |

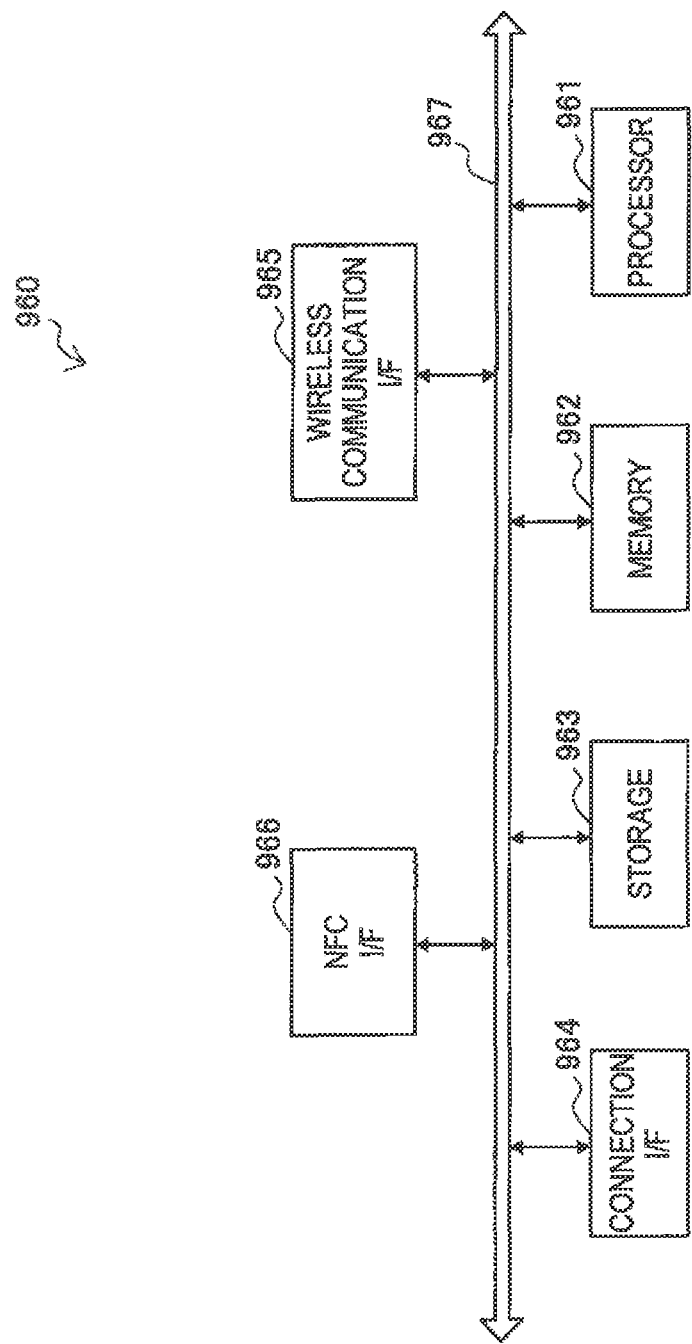

INFORMATION PROCESSING TO CONTROL POLLING FOR SHORT RANGE WIRELESS COMMUNICATION

TECHNICAL FIELD

The present disclosure relates to a terminal device, a program, and an information processing device.

BACKGROUND ART

In recent years, devices that have a short range wireless communication function that has a narrow communication range are widely used. Near field communication (NFC) is an example of the short range wireless communication and various technologies related to NFC have been proposed.

For example, Patent literature 1 discloses a technology that prevents erroneous communication by connecting a master device and a slave device to each other using NFC in a case in which the slave devise is determined to be inside an NFC area of the master device.

CITATION LIST

Patent Literature

Patent literature 1: JP 2012-169779A

SUMMARY OF INVENTION

Technical Problem

However, conventional technologies including the technology disclosed in Patent Literature 1 described above may degrade the convenience of the user. Specifically, for example, in order to perform NFC between two devices that have NFC functions, polls related to NFC are transmitted and received between the two devices. For example, in order to reduce consumption of electric power, long time intervals may be set for the time intervals of the polls described above. Accordingly, even if one of the two devices that have the NFC functions are brought near to the other, it may take a long time to transmit and receive the polls between the two devices and, as a result, it may take a long time until NFC is performed. Accordingly, the user needs to have the two devices described above near each other for some time. As described above, convenience of the user may be degraded.

Note that in order to shorten the time until NFC is performed, short time intervals may be set as the time intervals of the polls related to NFC. However, when the polling intervals are constantly short, consumption of electric power due to polling may become large.

Accordingly, it is desirable that a system that, while increasing the convenience of the user of the device having the function, for the short range wireless communication, enables the consumption of electric power of the device to be suppressed be provided. Note that the above problem is an example, and together with the above problem, or in place of the above problem, other problems may be the problems that are to be solved.

Solution to Problem

According to the present disclosure, there is provided a terminal device including: an acquisition unit configured to acquire a result of determination of whether another terminal device that has a function for short range wireless communication is positioned near the terminal device; and a control unit configured to, on the basis of the result of the determination, control a time interval of polling related to fee short range wireless communication.

According to the present disclosure, there is provided a program for causing a processor configured to control a terminal device to execute processing of: acquiring a result of determination of whether another terminal device that has a function for short range wireless communication is positioned near the terminal device; and controlling, on the basis of the result of the determination, a time interval of polling related to the short range wireless communication.

According to the present disclosure, there is provided an information processing device that controls a terminal device, the information processing device including: one or more processors; and a memory configured to store a program that is executed by the one or more processors. The program is configured to execute processing of acquiring a result of determination of whether another terminal device that has a function for short range wireless communication is positioned near the terminal device, and controlling, on the basis of the result of the determination, a time interval of polling related to the short range wireless communication.

Advantageous Effects of Invention

As described above, according to the present disclosure, while convenience of the user of the device having the NFC function can be increased, consumption of electric power of the device can be suppressed. Note that the effects described above is not necessarily limiting, and together with the effects described above, or in place of the effects described above, either of the effects set forth in the present description or other effects that can be perceived from the present description may be exerted.

BRIEF DESCRIPTION OF DRAWINGS

FIG. 3 is as explanatory drawing for describing examples of configuration methods.

FIG. 4 is an explanatory drawing for describing an example of a list of NFC supporting devices.

FIG. 14 is a block diagram showing an example of a schematic configuration of a wireless communication module to which the technology of the present disclosure can be applied.

DESCRIPTION OF EMBODIMENTS

Figure 1:
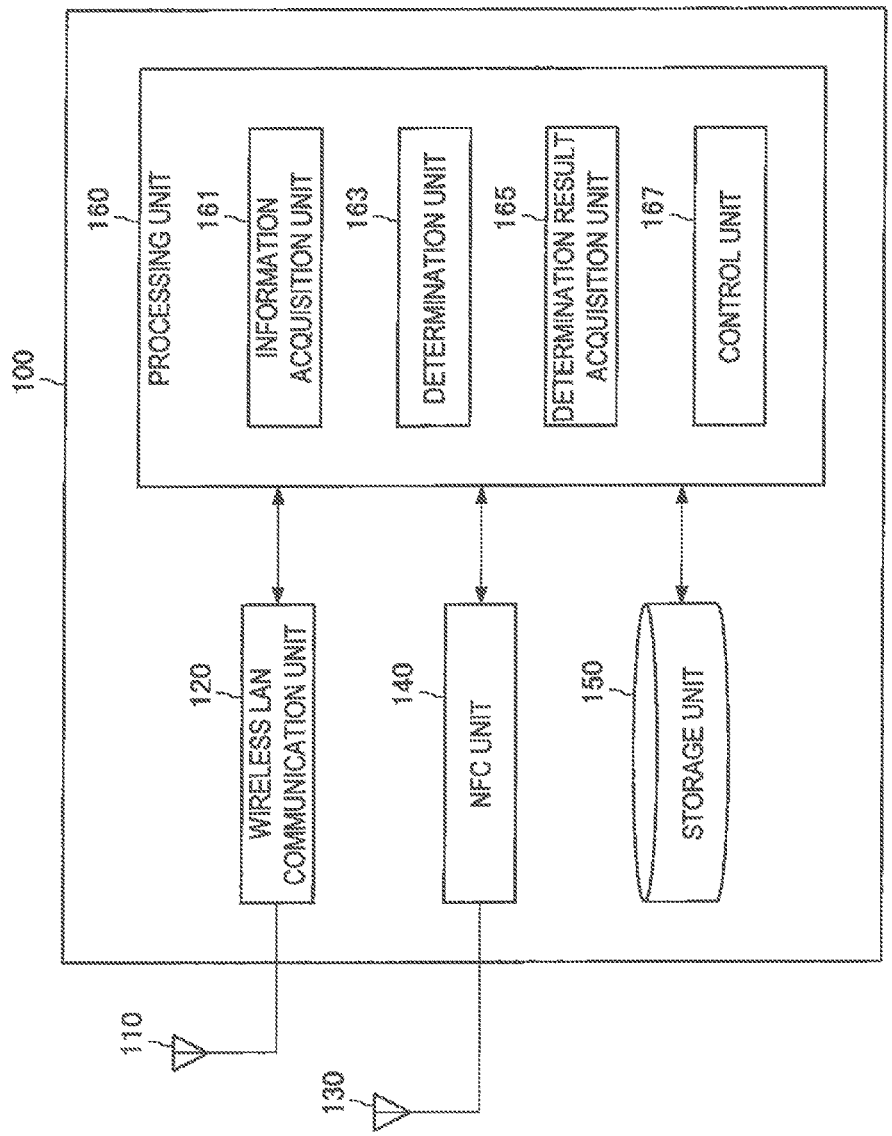
FIG. 1 is a block diagram illustrating an example of a configuration of a terminal device according to an embodiment of the present disclosure.

Hereinafter, exemplary embodiments of the present disclosure will be described in detail with reference to accompanying drawings. It should be noted that, in the specification and the drawings, overlapping description will be avoided by giving the same reference numerals to constituent elements that have substantially the same functional configurations.

Note that the description will be given in the following order.
1. Configuration of terminal device
2. Flow of process
3. Modification
4. Application example
5. Conclusion 1. Configuration of Terminal Device Referring to FIGS. 1 to 6, an example of a configuration of a terminal device 100 according to the present embodiment will be described. FIG. 1 is a block diagram illustrating the example of the configuration of the terminal device 100 according to the present embodiment. Referring to FIG. 1, the terminal device 100 includes a first antenna unit 110, a wireless local area network (LAN) communication unit 120, a second antenna unit 130, an NFC unit 140, a storage unit 150, and a processing unit 160.

(First Antenna Unit 110)

The first antenna unit 110 receives a wireless LAN communication signal and outputs the received signal to the wireless LAN communication unit 120. Furthermore, the first antenna unit 110 transmits a signal output by the wireless LAN communication unit 120.

(Wireless LAN Communication Unit 120)

The wireless LAN communication unit 120 performs wireless LAN communication. The wireless LAN communication is wireless communication that conforms to either of the wireless LAN standard or the wireless fidelity (Wi-Fi) standard (for example, IEEE 802.11, more specifically, IEEE 802.11a, 11b, 11g, 11n, 11ac, 11ad, or the like).

For example, when the communication mode of the terminal device 100 is in infrastructure mode, the wireless LAN communication unit 120 communicates with a wireless LAN access point. Furthermore, when the communication mode of the terminal device 100 is in direct communication mode (or in ad hoc mode), the wireless LAN communication unit 120 directly communicates with another terminal device that has a wireless LAN communication function.

The wireless LAN communication unit 120, for example, performs reception processing (for example, down-conversion, demodulation, and decoding) on a signal received through the first antenna unit 110 and provides information obtained through the reception processing to the processing unit 160. Furthermore, for example, the wireless LAN communication unit 120 performs transmission processing (for example, coding, modulation, and up-conversion) on information provided by the processing unit 160 and outputs a signal obtained by transmission processing to the first antenna unit 110.

(Second Antenna Unit 130)

The second antenna unit 130 receives an NFC signal and outputs the received NFC signal to the NFC unit 140. Furthermore, the second antenna unit 130 transmits the signal output by the NFC unit 140.

(NFC Unit 140)

The NFC unit 140 performs near field communication (NFC). The NFC is wireless communication that, for example, conforms to either of the NFC standard (ISO/IEC 14443 Type A, ISO/IEC 14443 Type B, ISO/IEC 15693, ISO/IEC 18092, ISO/IEC 21481, or the like).

For example, the NFC unit 140 communicates with another devise that has an NFC function. As an example, the NFC unit 140 communicates with another device that is positioned with, in about 10 cm from the terminal device 100. Note that the NFC function described above includes a reader/writer for NFC (that is, an NFC reader/writer) or a tag for NFC (that is, an NFC tag).

The NFC unit 140, for example, performs reception processing (for example, down-conversion, demodulation, and decoding) on a signal received through the second antenna unit 130 and provides information obtained the through reception processing to the processing unit 160. Furthermore, for example, the NFC unit 140 performs transmission processing (for example, coding, modulation, and up-conversion) on information provided by the processing unit 160 and outputs a signal obtained by transmission processing to the second antenna unit 120.

Note that when another terminal device has both the wireless LAN communication function and the NFC function, the terminal device 100 can perform wireless LAN communication and NFC with the above another terminal device. A specific example of the above point will be described below with reference to FIG. 2.

Figure 2:
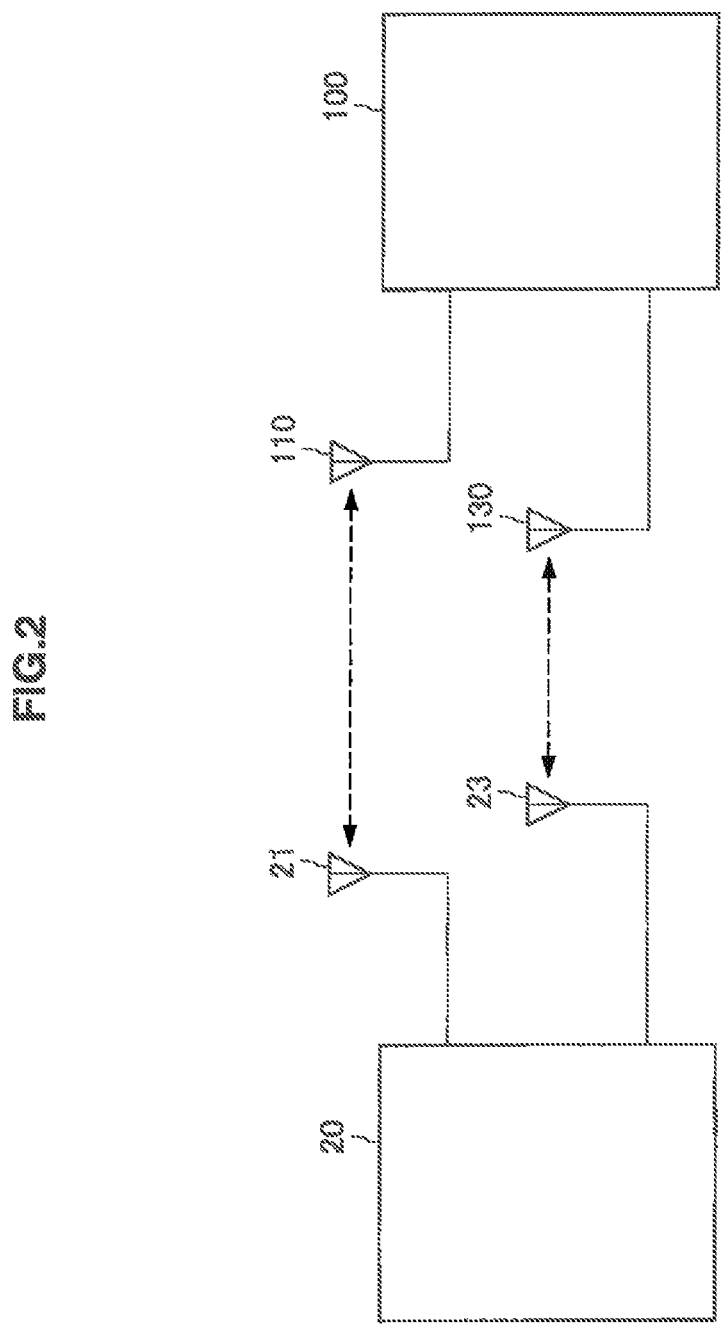
FIG. 2 is an explanatory drawing for describing an example of wireless LAN communication and NFC between terminal devices.

FIG. 2 is an explanatory drawing for describing an example of wireless LAN communication and NFC between terminal devices. Referring to FIG. 2, the terminal device 100 and a terminal device 20 are illustrated. The terminal device 20 has the wireless LAN communication function and performs wireless LAN communication through an antenna 21. Furthermore, the terminal device 20 has the NFC function and performs NFC through an antenna 23. In the above case, the terminal device 100 can perform wireless LAN communication with the terminal device 20 through the first antenna unit 110 and can perform NFC with the terminal device 20 through the second antenna unit 130.

NFC is performed in the above manner. Note that wireless LAN communication is wireless communication that has a communication range that is wider than the communication range of NFC.

(Storage Unit 150)

The storage unit 130, the storage unit 150 temporarily or permanently stores a program and data for operating the terminal device 100.

(Processing Unit 160)

The processing unit 160 provides various functions of the terminal device 100. The processing unit 160 includes an information acquisition unit 161, a determination unit 163, a determination result acquisition unit 165, and a control unit 167.

(Information Acquisition Unit 161)

The information acquisition unit 161 acquires information that is required in the processing performed by the processing unit 160.

—Acquisition of NFC Function Information

For example, the information acquisition unit 161 acquires information (hereinafter, referred to as "NFC function information") that is provided from another terminal device through wireless LAN communication and that indicates whether the NFC function is available. The information acquisition unit 161 acquires the NFC function information through the wireless LAN communication unit 120.

More specifically, for example, the NFC function information described above is information included in a beacon or a probe response from another terminal device. As an example, the NFC function information described above is information of the supported configuration methods. A specific example of the above point will be described below with reference to FIG. 3.

FIG. 3 is an explanatory drawing for describing examples of the configuration methods. Referring to FIG. 3, a list of the configuration methods is illustrated. The list is specified in table 33 in the Wi-Fi Simple Configuration Technical Specification. For example, in the list described above, "External NFC Token", "Integrated NFC Token", and "NFC Interface" each indicates whether the NFC function is available. Among such configuration methods, information of the supported configuration methods is notified by another terminal device. As an example, such information of the configuration methods is notified to the terminal device 100 as 2-byte information in a probe response.

The NFC function information is acquired, in the above manner. As described above, by providing the NFC function information through wireless LAN communication, it is possible to know whether another terminal device positioned near the terminal device 100 has NFC. Furthermore, as described above, by providing the NFC function information in a beacon or a probe response, for example, it is possible to acquire the NFC function information without an addition of a new message. Moreover, as described above, if the NFC function information is information of the supported configuration method, for example, it is possible to acquire the NFC function information from existing information.

(Determination Unit 163)

The determination unit 163 performs determination of whether another terminal device having the NFC function is positioned near the terminal device 100.

For example, the above determination is performed on the basis of the NFC function information described above. In other words, the determination unit 163 performs determination of whether another terminal device having the NFC function is positioned near the terminal device 100 on the basis of the NFC function information described above.

Specifically, for example, the determination unit 163 generates a list of NFC supporting devices from the NFC function information described above. Then, the determination unit 163 performs determination of whether another terminal device having the NFC function is positioned near the terminal device 100 on the basis of the list. A specific example of the above point will be described below with reference to FIG. 4.

FIG. 4 is an explanatory drawing for describing an example of a list of the NFC supporting devices. Referring to FIG. 4, a table including, as attributes, addresses of the NFC supporting devices and timeout flags is illustrated. For example, when NFC function information provided by another terminal device is acquired, the determination unit 163 determines whether the another terminal device has the NFC function. Then, when the another terminal device described above has the NFC function, the determination unit 163 adds the address of the another terminal device described above to the list of the NFC supporting devices. Conversely, when the another terminal device described above do not have the NFC function, the determination unit 163 does not add the address of the another terminal device described above to the list of the NFC supporting devices. With the above, another terminal device that is positioned near the terminal device 100 (in other words, positioned near enough to the terminal device 100 allowing wireless LAN communication with fee terminal device 100 to be performed) and that has the NFC function is registered to the list of the NFC supporting devices. Furthermore, after acquiring the NFC function information provided by the another terminal device, when an NFC signal from the another terminal device is not received within a predetermined time, the determination unit 163 turns the timeout flag corresponding to the address of the another terminal device to "1" from "0". With the above, in a case in which another terminal device has merely been positioned near the terminal device 100 and no NFC is performed then after within a predetermined time (30 seconds or 1 minute, for example), the timeout flag of the another terminal device described above in the list of the NFC supporting devices is turned to "1". When one or more addresses of the NFC supporting devices are registered and if either of the timeout flags is "0" in the list of the NFC supporting devices, the determination unit 163 determines that there is another terminal device having the NFC function positioned near the terminal device 100. On the other hand, if not so, the determination unit 163 determines that there is no other terminal device having the NFC function positioned near the terminal device 100. In the example illustrated in FIG. 4, addresses of three terminal devices are registered in the list of the NFC supporting devices, and the timeout flag is already "1" in two of the three terminal devices while the timeout flag is still "0" in one of the three terminal devices described above. Accordingly, the determination unit 163 determines that another terminal device having the NFC function is positioned near the terminal device 100.

(Determination Result Acquisition Unit 165)

The determination result acquisition unit 165 acquires the determination result on whether another terminal device having the NFC function is positioned near the terminal device 100. For example, when the determination unit 163 performs the determination described above, the determination result acquisition unit 165 acquires the determination result.

For example, the determination result described above is information indicating whether another terminal device having the NFC function is positioned near the terminal device 100. Furthermore, the determination result acquisition unit 165 acquires the determination result described above in both cases, namely, a first case in which another terminal device having the NFC function is positioned near the terminal device 100 and a second case in which another terminal device having the NFC function is not positioned near the terminal device 100.

Note that the determination result described above may be information indicating that another terminal device having the NFC function is positioned near the terminal device 100. In such a case, the determination result acquisition unit 165 may acquire the determination result described above in the first case described above and may not acquire the determination result described above in the second case described above. Furthermore, the determination result described above may be information indicating that another terminal device having the NFC function is not positioned near the terminal device 100. In such a case, the determination result acquisition unit 165 may acquire the determination result described above in the second case described above and may not acquire fee determination result described above in the first case described above.

(Control Unit 167)

According to the determination result described above, the control unit 167 controls the polling time interval (hereinafter, referred to as "polling interval") related to the NFC.

For example, when another terminal device is positioned near the terminal device 100, the control unit 167 controls the polling intervals described above so that the polling intervals described above are shorter compared with a case in which no other terminal device is positioned near the terminal device 100.

More specifically, for example, in a case is which the determination result described above is information indicating that another terminal device having the NFC function is positioned near the terminal device 100, the control unit 167 controls the polling interval so that the interval of the polling interval becomes short. On the other hand, in a case in which the determination result described above is information indicating that no other terminal device having the NFC function is positioned near the terminal device 100, the control unit 167 controls the polling interval so that the interval of the polling interval becomes long. A specific example of the above point will be described below with reference to FIGS. 5 and 6.

Figure 5:
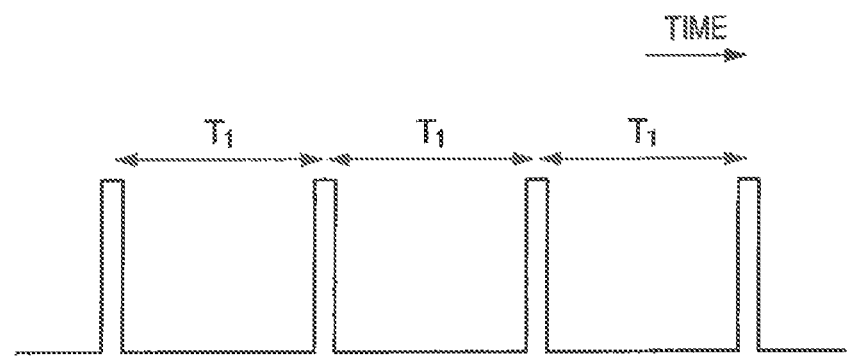
FIG. 5 is an explanatory drawing for describing an example of polling intervals in a case in which there is so other terminal device positioned near the terminal device.

FIG. 5 is an explanatory drawing for describing an example of polling intervals in a case in which there is no other terminal device positioned near the terminal device 100. Referring to FIG. 5, polling intervals 11 are illustrated. For example, when it is determined that there is no other terminal device positioned near the terminal device 100, the control unit 167 makes the NFC unit 140 transmit polls at polling intervals 11.

Figure 6:
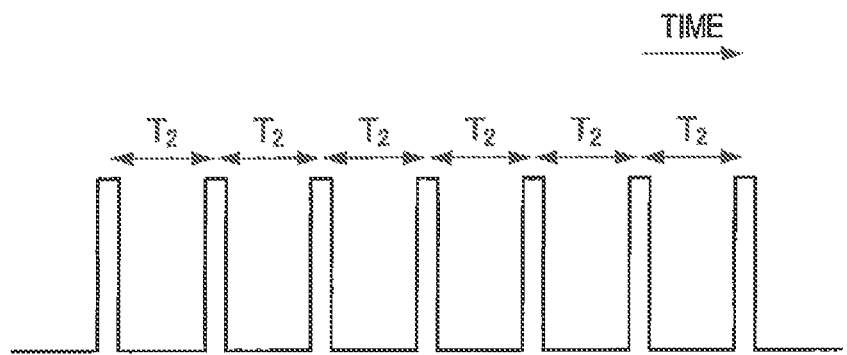
FIG. 6 is an explanatory drawing for describing an example of polling intervals in a case in which there is another terminal device positioned near the terminal device.

FIG. 6 is an explanatory drawing for describing an example of polling intervals in a case in which there is another terminal device positioned near the terminal device 100. Referring to FIG. 6, polling intervals T2 that are shorter than the polling intervals T1 illustrated in FIG. 5 are illustrated. For example, when it is determined drat there is another terminal device positioned near the terminal device 100, the control unit 167 makes the NFC unit 140 transmit polls at polling intervals T2.

As described above, the polling intervals are controlled according to the determination result. Accordingly, when there is a possibility of performing NFC, the polling intervals are shorter. Accordingly, when either one of the terminal device 100 or another terminal device is brought near the other, transmission and reception of polls between the terminal device 100 and the another terminal device are performed in a short time. As a result, NFC is performed as soon as a user brings the terminal device 100 and another terminal, device near each other. Convenience of the user is increased in the above manner. Furthermore, when there is no possibility of performing NFC, the polling intervals are longer. Accordingly, consumption of electric power of the terminal device 100 can be suppressed. In other words, while convenience of the user of the terminal device 100 having the NFC function is increased, consumption of electric power of the terminal device 100 can be suppressed.

Note that as specific processing, for example, the control unit 167 controls the polling intervals described above by outputting a command for setting the polling intervals described above. For example, the command described above includes information of the polling intervals. Furthermore, when the command described above is output, the NFC unit 140 sets the polling intervals on the basis of the command. Subsequently, the NFC unit 140 transmits the polls at the set polling intervals.

Furthermore, for example, the command described above is a command that makes the module having the NFC function update the register that stores the polling intervals described above. For example, the NFC unit 140 includes a module (a chip, for example) that has the NFC function. Furthermore, when the command described above is output, the NFC unit 140 updates the value of the register that stores the polling intervals to a value of the polling intervals indicated by the command described above. The polling intervals are set in the above manner. Subsequently, the NFC unit 140 transmits the polls at the set polling intervals.

2. Flow of Process

Figure 7:
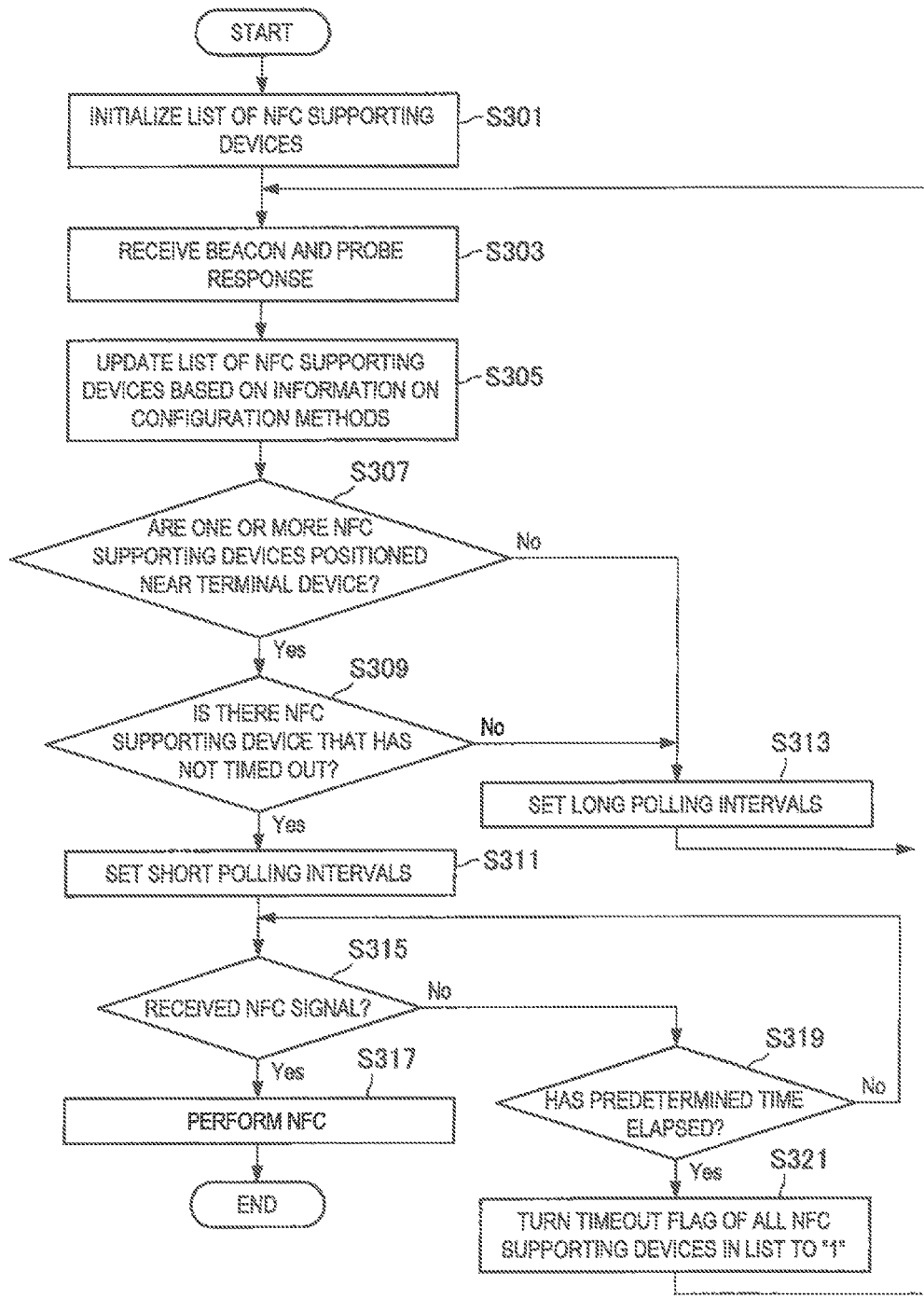
FIG. 7 is a flowchart illustrating an example of a schematic flow of a communication control process of the terminal device according to an embodiment.
Figure 8:
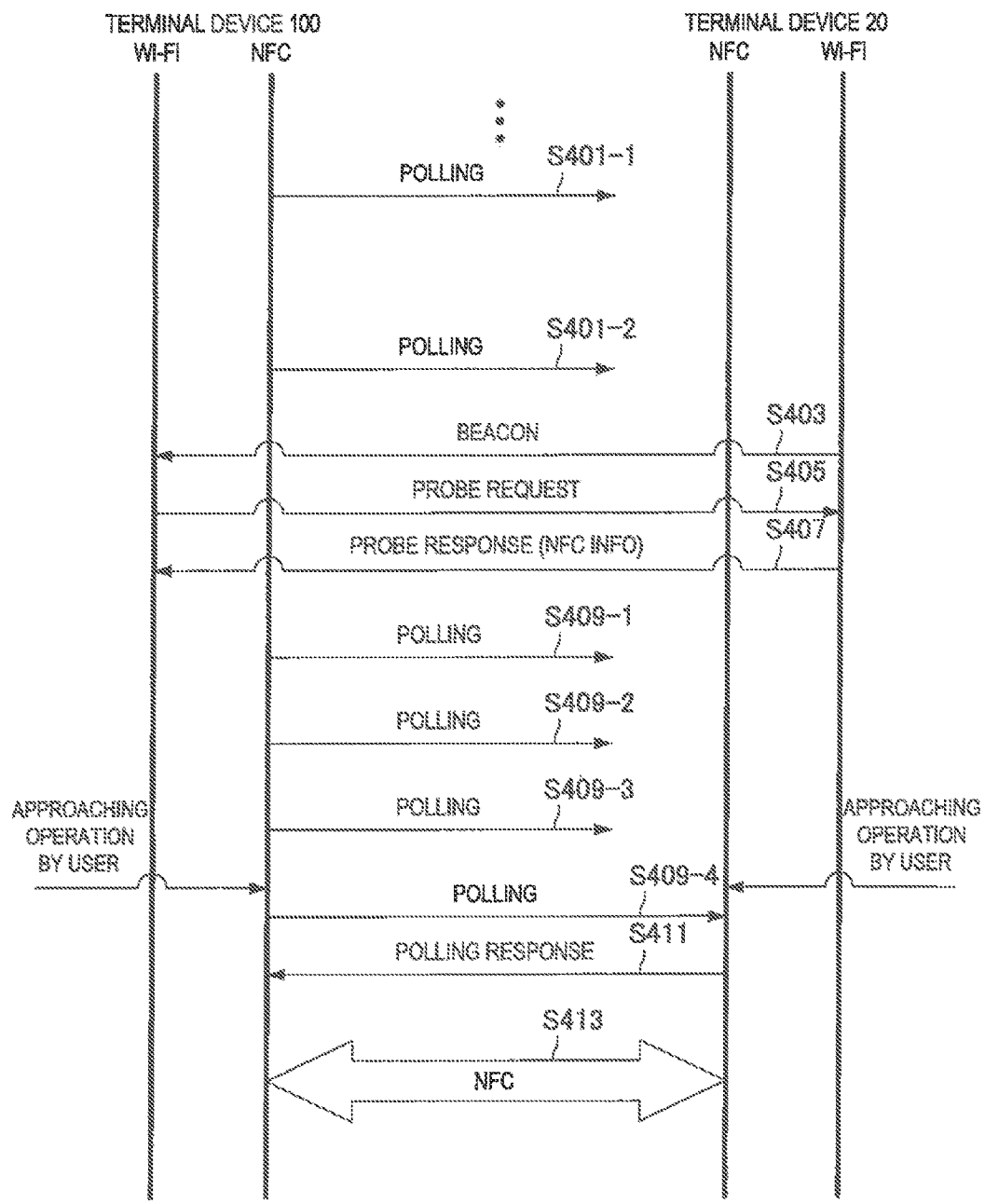
FIG. 8 is a sequence diagram illustrating an example of a schematic flow of a communication control process between the terminal device according to an embodiment and another terminal device.

Referring next to FIGS. 7 to 8, an example of a communication control process according to the present embodiment will be described.

(Process in Terminal Device)

FIG. 7 is a flowchart illustrating an example of a schematic flow of the communication control process of the terminal device 100 according to the present embodiment. The communication control process is started when both a first condition, that is, the NFC function for the terminal device 100 being effective, and a second condition, that is, the display of the terminal device 100 being on (or the state of the terminal device 100 being in an unlocked state), are satisfied.

The determination unit 163 first initializes the list of the NFC supporting devices (S301). In other words, the determination unit 163 updates the list described above so that no terminal device information (the address and the timeout flag, for example) is included in the list.

Furthermore, the wireless LAN communication unit 120 receives a beacon and a probe response (S303). The probe response includes information of the supported configuration method. Subsequently, the determination unit 163 updates the list of the NFC supporting devices on the basis of the information of the supported configuration method (S305).

Furthermore, on the basis of the list of the NFC supporting devices, the determination unit 163 determines whether one or more NFC supporting devices (in other words, one or more another terminal devices that have the NFC functions) axe positioned near the terminal device 100 (S307). When one or more NFC supporting devices are positioned near the terminal device 100 (S307: Yes), then on the basis of the list of the NFC supporting devices, the determination unit 163 further determines whether there is an NFC supporting device that has not timed out (S309). When there is an NFC supporting device that has sot timed out (S309: Yes), the determination unit 163 determines that an NFC supporting device (in other words, another terminal device that has the NFC function) is positioned near the terminal device 100 and the control unit 167 makes the NFC unit 140 set short polling intervals (S311). Then, the NFC unit 140 transmits polls at the short polling intervals.

Subsequently, when, an NFC signal is received (S315: Yes), the terminal device 100 performs NFC (S317). Then, the process is ended.

On the other hand, when m NFC signal is not received (S315: No), the determination unit 163 determines whether a predetermined time has elapsed from when the short polling intervals have been set (S319). When the predetermined time has elapsed (S319: Yes), the timeout flags of all the NFC supporting devices are turned to "1" in the list of the NFC supporting devices (S321), and the process returns to step S303. On the other hand, when the predetermined time has not elapsed (S319: No), the process returns to step S315.

Note that when no NFC supporting device is positioned near the terminal device 100 (S307: No) or when all of the NFC supporting devices have timed out (S309: No), the control unit 167 makes the NFC unit 140 set long polling intervals (S313). Then, the process returns to step S303.

The communication control process of the terminal device 100 is performed in the above manner. Note that the predetermined time described above of the timeout flag is, for example, is set by a user or a vendor of the terminal device 100. When the predetermined time described above is set to a short time, the electric power consumption becomes small. However, in such a case, since the polling intervals return to long intervals in a short time, it may take a long time until the NFC is performed. As a result, the convenience of the user may be degraded. On the other hand, when the predetermined time described above is set to a long time, the electric power consumption becomes large. As a result, the battery duration time may become short. Accordingly, it is desirable that the predetermined time described above is set at an appropriate time that is not too short and not too long.

(Process Between Terminal Devices)

FIG. 8 is a sequence diagram illustrating an example of a schematic flow of a communication control process between the terminal device 100 according to the present embodiment and another terminal device 20.

The terminal device 100 first transmits polls related to NFC at long polling intervals (S401-1 and S401-2).

Subsequently, the terminal device 20 transmits a beacon related to wireless LAN communication, and the terminal device 100 receives the beacon (S403). The beacon includes an extended service set identifier (ESS-ID). Subsequently, the terminal device 100 transmits a probe request that includes the ESS-ID included in the beacon, and the terminal device 20 receives the probe request (S405). Then, the terminal device 20 transmits a probe response including the NFC function information, and the terminal device 100 receives the responded probe response (S407). For example, the NFC function information described above is information of the supported configuration method.

In the present example, the NFC function information described above is information indicating that there is the NFC function, and as a result, the terminal device 100 sets short polling intervals. Then, the terminal device 100 transmits polls related to NFC at short polling intervals (S409-1 S409-2 and S409-3).

Subsequently, with an approaching operation by the user, the terminal device 100 and the terminal device 20 are brought close to each other. Then, the terminal device 20 receives polls related to NFC that are transmitted by the terminal device 100 (S409-4). Then, the terminal device 20 transmits a polling response, and the terminal device 100 receives the polling response (S411). Subsequently, the terminal device 100 and the terminal device 20 perform NFC with each other (S413).

3. Modification

A modification of the present embodiment will be described next. A terminal device 101 according to a modification of the present, embodiment generates a magnetic flux, when another terminal device is performing NFC with the terminal device 101, in a direction extending towards a position where the another terminal device is to be disposed. With the above, for example, a relationship between a position of an NFC antenna of the terminal device 101 and a position of an NFC antenna of the another terminal device 20 can be in a positional relationship that is suitable for NFC. As a result, errors in NFC can be reduced.

(Configuration of Terminal Device 101)

Figure 9:
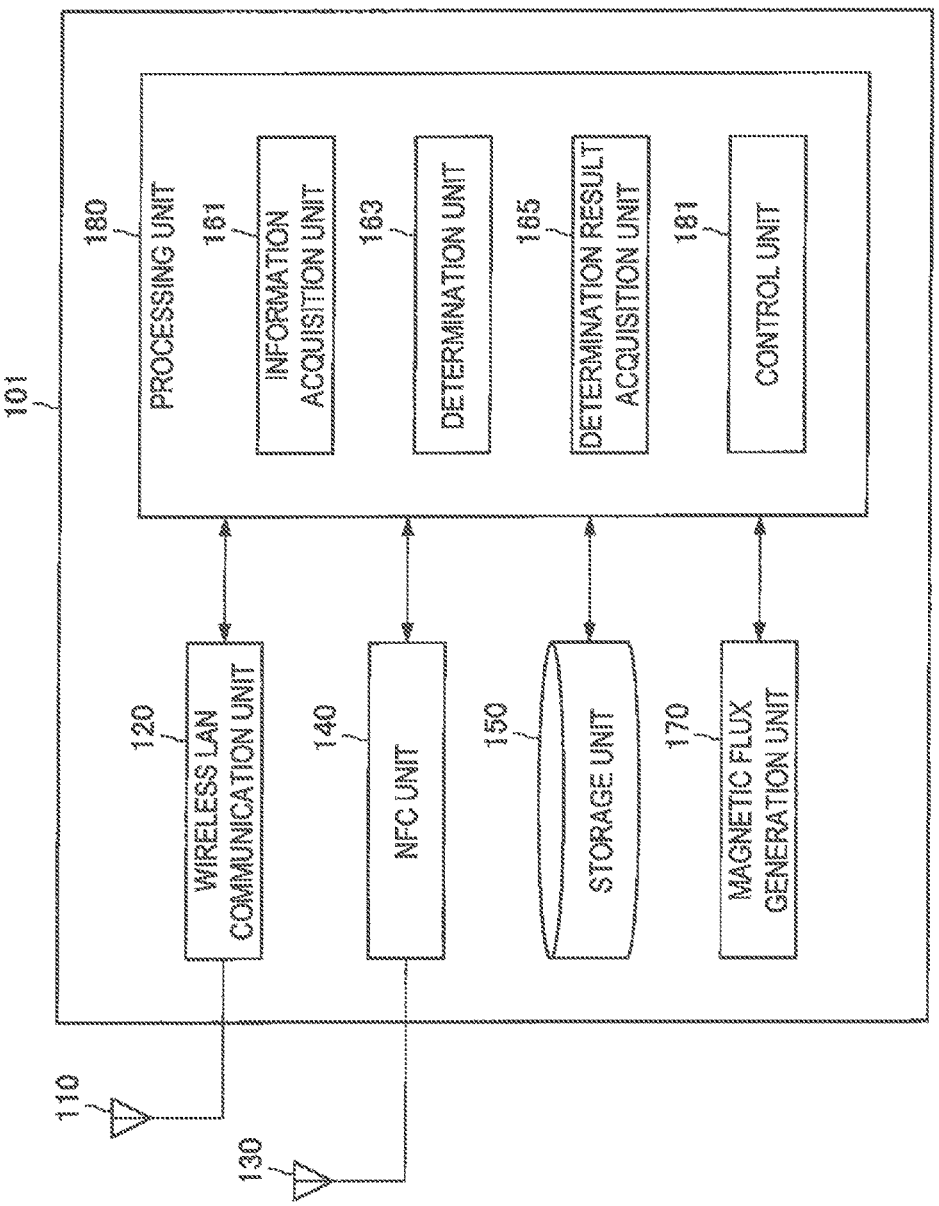
FIG. 9 is a block diagram illustrating an example of a configuration of a terminal device according to a modification of an embodiment.

FIG. 9 is a block diagram illustrating an example of a configuration of the terminal device 101 according to the modification of the present embodiment. Referring to FIG. 9, the terminal device 101 includes a first antenna unit 110, a wireless LAN communication unit 120, a second antenna unit 130, an NFC unit 140, a storage unit 150, a magnetic flux generation unit 170, and a processing unit 180. Furthermore, the processing unit 180 includes an information acquisition unit 161, a determination unit 163, a determination result acquisition unit 165, and a control unit 181.

Herein, the first antenna unit 110, the wireless LAN communication unit 120, the second antenna unit 130, the NFC unit 140, the storage unit 150, the information acquisition unit 161, the determination unit 163, and the determination result acquisition unit 165 have no difference between those of the terminal device 100 according to the present embodiment described with reference to FIG. 1 and those of the terminal device 101 according to the modification of the present embodiment that will be described with reference to FIG. 9. Accordingly, herein, description of only the magnetic flux generation unit 170 and the control unit 181 will be given.

(Magnetic Flux Generation Unit 170)

Figure 10:
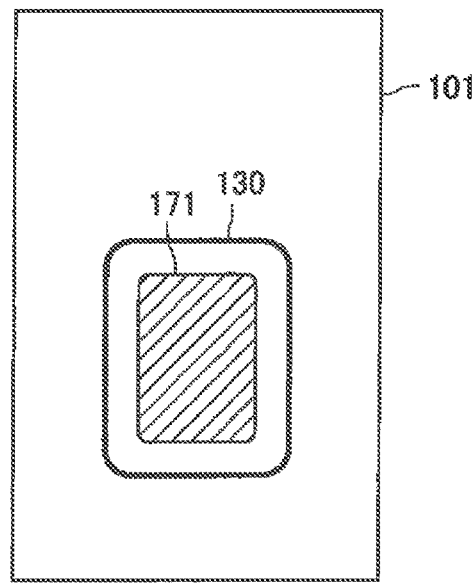
FIG. 10 is an explanatory drawing for describing an example of an electromagnetic coil included in the terminal device.

The magnetic flux generation unit 170 generates a magnetic flux. For example, the magnetic flux generation unit 170 includes an electromagnetic coil. Specifically, for example, an electric current flowing through the electromagnetic coil generates a magnetic flux. Referring to FIG. 10, an example of a specific disposition of the electromagnetic coil will be described below.

FIG. 10 is an explanatory drawing for describing an example of the electromagnetic coil included in the terminal device 101. Referring to FIG. 10, the terminal device 101 is illustrated. In the example, a back face of the terminal device 101 is illustrated. The terminal device 101 includes the second antenna unit 130 for NFC and an electromagnetic coil 171. As illustrated, for example, the second antenna unit 130 and the electromagnetic coil 171 are disposed hi the vicinity of the back surface of the terminal device 101. Furthermore, for example, the electromagnetic coil 171 is disposed in an area surrounded by the second antenna unit 130. Furthermore, the electromagnetic coil 171 generates a magnetic flux in a direction from a front face to the hack face of the terminal device 101 or in a direction from the back face to the front face of the terminal device 101.

Note that since the electromagnetic coil 171 is driven by direct current, the electromagnetic coil 271 does not become a source of interference to the frequency (13.56 MHz, for example) for NFC. Furthermore, for example, the electric current flowing in the electromagnetic coil 171 is sufficiently smaller than the electric current flowing in the coil for NFC. As a result, the magnetic field of NFC is averted from being blocked.

Furthermore, for example, the electric current only flows to the electromagnetic coil during when the NFC is performed. Accordingly, consumption of electric power in the electromagnetic coil is sufficiently small.

(Control Unit 181)

—Control of Polling Interval

The control unit 181 controls the polling intervals on the basis of the determination result on whether another terminal device having the NFC function is positioned near the terminal device 101. The above point is as described above with reference to FIG. 1.

—Control of Magnetic Flux

In particular, in the modification of the present embodiment, the control unit 281 controls the generation of the magnetic flux by the magnetic flux generation unit 170 so that a magnetic flux is generated m a direction in which the another terminal device is to be disposed when the another terminal device performs NFC with the terminal device 101 or a magnetic flux is generated in a direction opposite to the above direction.

For example, the control unit 181 controls the generation of the magnetic flax by distributing an electric current to the electromagnetic coil 171 from a battery. When the electric current flows in the electromagnetic coil 171, a magnetic flux corresponding to the direction of the electric current is generated. For example, the electric current is distributed in the electromagnetic coil 171 so that a magnetic flux is generated in a direction in which the another terminal device is to be disposed when the another terminal device performs NFC with the terminal device 101.

As an example, referring again to the example in FIG. 10, the direction in which the another terminal device is to be disposed when the another terminal device performs NFC with the terminal device 101 is a direction from the front face to the back face of the terminal device 101. Accordingly, the electric current is distributed to the electromagnetic coil 171 so that a magnetic flux is generated in the direction from the front face to the back face of the terminal device 101 (in other words, a magnetic flux oriented towards the outside from the back face of the terminal device 101).

First Example: When Another Terminal Device Includes Electromagnetic Coil

As a first example, the another terminal device includes an electromagnetic coil in a manner similar to that of the terminal device 101. For example, in a case in which the another terminal device includes an NFC reader/writer as the NFC function, the another terminal device includes an electromagnetic coil as above. In the above case, when the another terminal device is positioned near the terminal device 101 and, as described above, when a magnetic field is generated, an electromagnetic force that pulls the center of the electromagnetic coil 171 of the terminal device 101 and the center of the electromagnetic coil of the another terminal device to each other is generated. An example of a disposition of the electromagnetic coil in the another terminal device will be described below.

Figure 11:
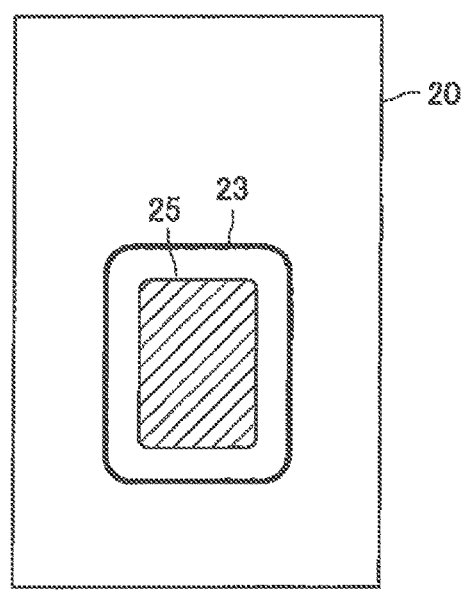
FIG. 11 is an explanatory drawing for describing an example of an electromagnetic coil included in another terminal device.

FIG. 11 is an explanatory drawing for describing an example of the electromagnetic coil included in the another terminal device 20. Referring to FIG. 11, the terminal device 20 is illustrated. In the example, a back face of the terminal device 20 is illustrated. The terminal device 20 includes an antenna 23 for NFC and an electromagnetic coil 25. As described above, for example, the antenna 23 and the electromagnetic coil 25 of the terminal device 20 are disposed in a similar manner to the second antenna unit 130 and the electromagnetic coil 171, respectively, of the terminal device 101. Furthermore, as described above, when a magnetic flux is generated from the terminal device 101, an electromagnetic force that pulls the center of the electromagnetic coil 171 of the terminal device 101 and the center of the electromagnetic coil 25 of the terminal device 20 to each other is generated.

The electromagnetic force is generated in the above manner. As a result, for example, the second antenna unit 130 of the terminal device 101 and the antenna 23 of the terminal device 20 are positioned so as to face each other, and are positioned close to each other. In other words, the relationship between the position of the NFC antenna of the terminal device 101 and the position of the NFC antenna of the another terminal device 20 is in a positional relationship that is suitable for NFC. As a result, errors m NFC can be reduced.

Note that when NFC is performed, in accordance with the NFCIP1 (ISO/IEC 18092) standard, either one of the terminal device 101 and the terminal device 20 is determined as an Initiator terminal and the other one is determined as the Target terminal. Furthermore, when the terminal device 101 is determined as the Initiator terminal and the terminal device 20 is determined as the Target terminal, the terminal device 101 generates a magnetic flux described as above in a direction from the front face to the back face of the terminal device 101, and the terminal device 20 generates a magnetic flux in a direction from the back face to the front face of the terminal device 20. On the other hand, when the terminal device 20 is determined as the Initiator terminal and the terminal device 101 is determined as the Target terminal, the terminal device 20 that is the Initiator terminal generates a magnetic flux in a direction from the front face to the back face of the terminal device 20 (in other words, a magnetic flux oriented towards the outside from the back side of the terminal device 20), and the terminal device 101 that is the Target terminal generates a magnetic flax in a direction from the back face to the front face of the terminal device 101 (in other words, a magnetic fins oriented towards the inside from the back side of the terminal device 101).

Second Example: When Another Terminal Device Includes Metal Plate

The another terminal device may include a metal plate rather than the electromagnetic coil. For example, in a case in which the another terminal device includes an NFC tag as the NFC function, as above, a metal plate may be included. Furthermore, similar to the electromagnetic coil, the metal plate may be disposed in an area surrounded by the NFC antenna.

In the above case, when the another terminal device described above is positioned near the terminal device 101 and, as described above, when a magnetic field is generated, an electromagnetic force that pulls the center of the electromagnetic coil 171 of the terminal device 101 and the metal plate of the another terminal device to each other is generated. As a result, similar to the case of the electromagnetic coil, errors in NFC can be reduced.

Note that the terminal device 101 may generate the magnetic flux as described above when an NFC tag is detected (when a probe response is received, for example).

—Generation of Magnetic Flux According to Size of Antenna for NFC

The control unit 181 may change rise size of the magnetic flux generated by the magnetic flux generation unit 170 according to the size of the antenna of the another terminal device that performs NFC with the terminal device 101. As a specific method, for example, the control unit 181 may change the size of the magnetic flux by changing the size of the electric current flowing in the electromagnetic coil 171.

For example, the control unit 181 may change the size of the magnetic flux such that the smaller the size of the antenna of the another terminal device described above becomes, the larger the size of the magnetic flux becomes, and the larger the size of the antenna of the another terminal device described above becomes, the smaller the size of the magnetic flux becomes.

For example, when the antenna of the another terminal device is small, it will be more difficult to set the relationship between the position of the antenna and the position of the NFC antenna of the terminal device 101 to have a positional relationship suitable for NFC. However, for example, by generating a larger magnetic flux and generating a larger electromagnetic force, it may be easier to set the positional relationship between the antennas to have a positional relationship suitable for NFC. As a result, for example, regardless of the size of the antenna, errors in NFC can be reduced.

Note that the control unit 181 may acquire information of the size of the antenna from the another terminal device through a wireless communication unit 120 or may acquire information of the size of the antenna from the another terminal device through the NFC unit 140.

4. Application Example

The technology according to the disclosure can be applied to various products. For example, the terminal device 100 and the terminal device 101 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the terminal device 100 and the terminal device 101 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the the terminal device 100 and the terminal device 101 may be wireless communication modules mounted in such terminals (for example, integrated circuit modules configured by one die).

4.1. First Application Example

Figure 12:
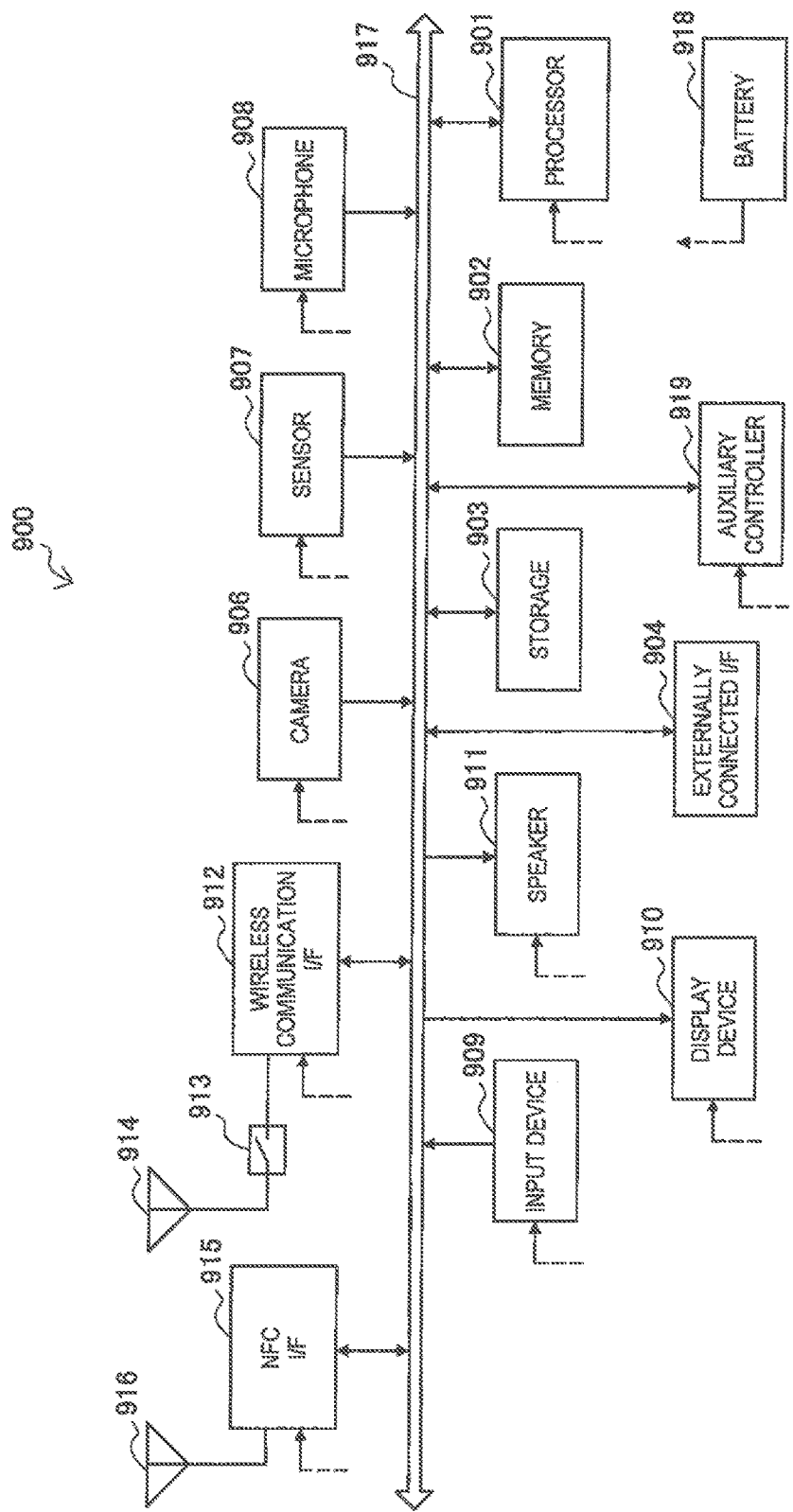
FIG. 12 is a block diagram showing an example of a schematic configuration of a smartphone to which the technology of the present disclosure can be applied.

FIG. 12 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 912, an antenna switch 913, an antenna 914, an NFC interface 915, another antenna 916, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data.

The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a keypad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 912 supports one or more wireless LAN standards of IEEE 802.11, to be more specific, IEEE 80211a, 11b, 11g, 11n, 11ac, and 11ad, to execute the wireless LAN communication. The wireless communication interface 912 can communicate with another device via a wireless LAN access point in an infrastructure mode. In addition, the wireless communication interface 912 can directly communicate with another device in a direct communication mode (or an ad hoc mode). The wireless communication interface 912 can typically include a baseband processor, an RF (Radio Frequency) circuit, a power amplifier, and the like. The wireless communication interface 912 may be a single-chip module on which a memory that stores a communication control program, a processor that executes the program, and a relevant circuit are integrated. The wireless communication interface 912 may support another kind of wireless communication scheme such as a cellular communication scheme in addition to the wireless LAN scheme. The antenna switch 913 switches a connection destination of the antenna 914 for a plurality of circuits (for example, circuits for different wireless communication schemes) included in the wireless communication interface 912. The antenna 914 has a single or a plurality of antenna elements (for example, a plurality of antenna elements constituting a MIMO antenna), and is used for transmission and reception of wireless signals from the wireless communication interface 912.

The NFC interface 915 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 915 can typically include a baseband processor, an RF circuit, a power amplifier, and the like. The NFC interface 915 may be a single-chip module on which a memory that stores a communication control program, a processor that executes the program, and a relevant circuit are integrated. The antenna 916 is used for transmission and reception of wireless signals from the NF interface 915.

Note that the smartphone 900 may include a plurality of antennas (for example, antennas for the cellular communication scheme, or the like), without being limited to the example of FIG. 12. In this case, the antenna switch 913 may be omitted from the configuration of the smartphone 900. In addition, the smartphone 900 may further include an electromagnetic coil.

The bus 917 connects the processor 901, the memory 902, the storage 903, the externally connected interface 904, the camera 906, the sensor 907, the microphone 908, the input device 909, the display device 910, the speaker 911, the wireless communication interface 912, the NFC interface 915, and the auxiliary controller 919 to one another. The battery 918 supplies electric power to each of the blocks of the smartphone 900 shown in FIG. 12 via power supply lines partially indicated by dashed lines in the drawing. The auxiliary controller 919 causes, for example, required minimum functions of the smartphone 900 to be operated in a sleep mode.

In the smartphone 900 illustrated in FIG. 12, the information acquisition unit 161, the determination unit 163, the determination result acquisition unit 165, and the control unit 167 and 181 that have been described using FIG. 1 and FIG. 9 may be installed in the processor 901 or the auxiliary controller 919. More specifically, for example, the information acquisition unit 161, the determination unit 163, the determination result acquisition unit 165, and the control unit 167 and 181 may be installed as a program (for example, a portion of an operating system (OS) or a portion of a device driver) that is executed by the processor 901 or the auxiliary controller 919. Furthermore, at least some of the functions of the above may be installed in a wireless communication interface 912 or an NFC interface 915. Furthermore, in the smartphone 900 illustrated in FIG. 12, the wireless LAN communication unit 120 and the NFC unit 140 described using FIG. 1 may be installed in the wireless communication interface 912 and the NFC interface 915, respectively.

Note that rise smartphone 900 may operate as a wireless access point (software AP) as the processor 901 executes the function for an access point at an application level. In addition, the wireless communication interface 912 may have the function for a wireless access point.

4.2. Second Application Example

Figure 13:
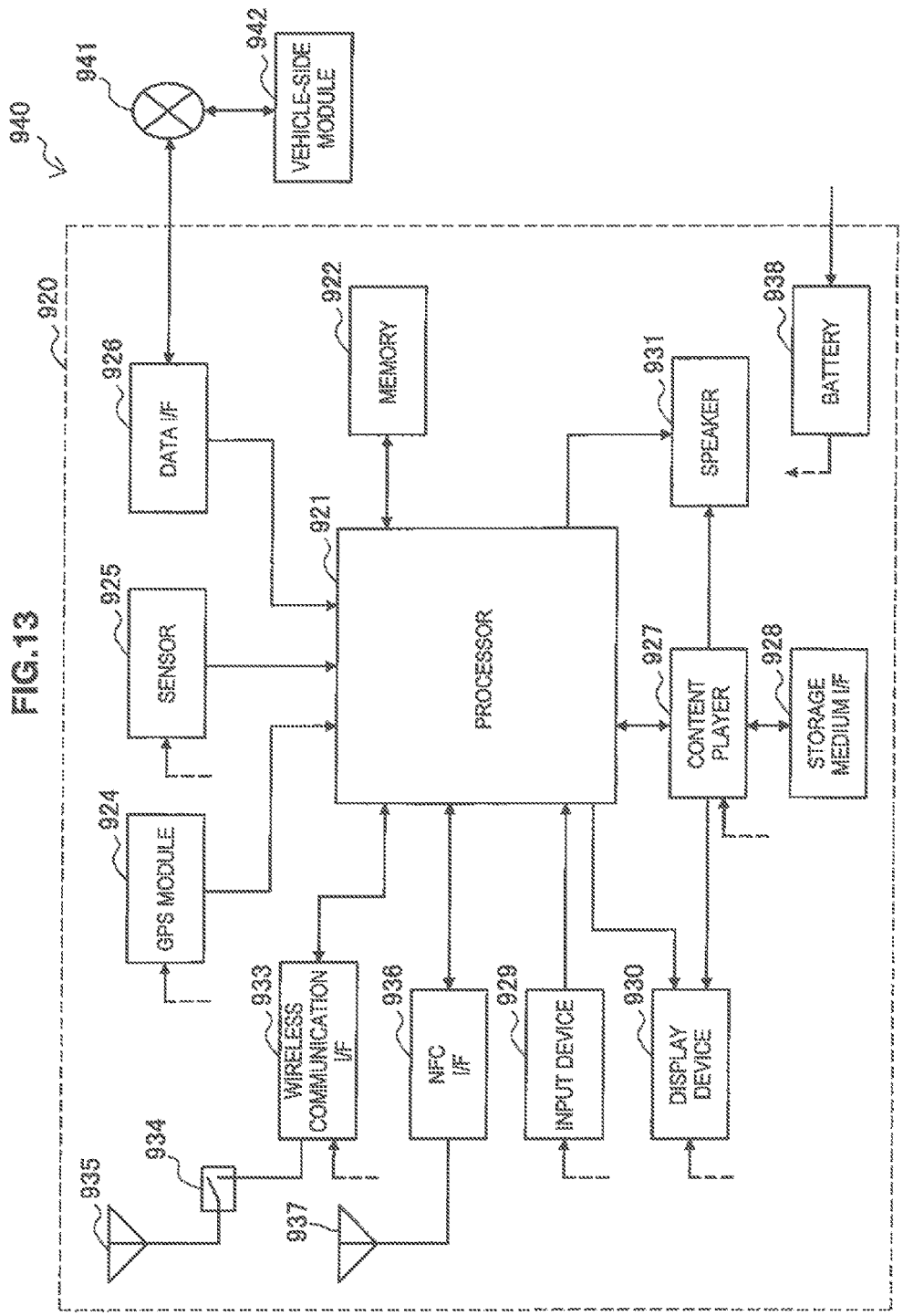
FIG. 13 is a block diagram showing an example of a schematic configuration of a car navigation device to which the technology of the present disclosure can be applied.

FIG. 13 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, an NFC interface 936, another antenna 937, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of the IEEE 802.11, to be more specific, IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in the direct communication mode (or the ad hoc mode). The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

The NFC Interface 936 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 936 can typically include a baseband processor, an RF circuit, a power amplifier, and the like. The NFC interface 936 may be a single-chip module on which a memory that stores a communication control program, a processor that executes the program, and a relevant circuit are integrated. The antenna 937 is used for transmission and reception of wireless signals from the NF interface 936.

Note that the car navigation device 920 may include a plurality of antennas, without being limited to the example of FIG. 13. In this case, the antenna switch 934 may be omitted from the configuration of the car navigation device 920. In addition, the ear navigation device 920 may further include an electromagnetic coil.

The battery 938 supplies electric power to each of the blocks of the car navigation device 920 shown in FIG. 13 via power supply lines partially indicated by dashed lines is the drawing. In addition, the battery 938 accumulates electric power supplied from the vehicle.

In the car navigation device 920 illustrated in FIG. 13, the information acquisition unit 161, the determination unit 163, the determination result acquisition unit 165, and the control unit 167 and 181 that have bees described using FIG. 1 and FIG. 9 may be installed in a processor 921. More specifically, for example, the information acquisition unit 161, the determination unit 163, the determination result acquisition unit 165, and the control unit 167 and 181 may be installed as a program (for example, a portion of an operating system (OS) or a portion of a device driver) that is executed by the processor 921. Furthermore, at least some of the functions of the above may be installed in the wireless communication interface 933 or the NFC interface 936. Furthermore, in the car navigation device 920 illustrated in FIG. 13, the wireless LAN communication unit 120 and the NFC unit 140 described using FIG. 1 may be installed in the wireless communication interface 933 and the NFC interface 936, respectively.

In addition, the technique of the present disclosure may be realized as a car-mounted system (for a vehicle) 940 that includes one or more blocks of the car navigation device 920 described above, the car-mounted network 941, and a vehicle-side side module 942. The vehicle-side module 942 generates vehicle-side data such as a car speed, an engine speed, or malfunction information, and then outputs the generated data to the car-mounted network 941.

4-3. Third Application Example

FIG. 14 is a block diagram showing an example of a schematic configuration, of a wireless communication module 960 to which the technology of the present disclosure can be applied. The wireless communication module 960 has a processor 961, a memory 962, a storage 963, a connection interface 964, a wireless communication interface 965, an NFC interface 966, and a bus 967.

The processor 961 may be, for example, a CPU controlling functions of the wireless communication module 960. The memory 962 includes a RAM and a ROM storing programs executed by the processor 961 and data. The storage 963 can include a storage medium such as a semiconductor memory or a hard disk. The connection interface 964 is an interface for connection with a terminal on which the wireless communication module 960 is mounted.

The wireless communication interface 965 supports one or more wireless LAN standards of the IEEE 802.11, to be more specific, IEEE 802.11a, 11b, 11g, 11n, 11ac, and 11ad, to execute wireless LAN communication. The wireless communication interface 965 can communicate with another device via a wireless LAN access point in the infrastructure mode. In addition, the wireless communication interface 965 can directly communicate with another device in the direct communication mode (or the ad hoc mode). The wireless communication interface 965 can typically include a baseband processor, an RF circuit, a power amplifier, and the like. The wireless communication interface 965 may be a single-chip module on which a memory that stores a communication control program, a processor that executes the program, and a relevant circuit are integrated. The wireless communication interface 965 may support another kind of wireless communication scheme such as the cellular communication scheme in addition to the wireless LAN scheme. Note that the wireless communication interface 965 transmits and receives wireless signals via an antenna. The antenna may be included in the terminal on which the wireless communication module 960 is mounted.

The NFC interface 966 supports one or more NFC standards such as ISO/IEC 14443 Type A, ISO/IEC 14443 Type B, ISO/IEC 15693, ISO/IEC 18092, ISO/IEC 21481, and the like to execute NFC. The NFC interface 966 can typically include a baseband processor, an RF circuit, a power amplifier, and the like. The NFC interface 966 may be a single-chip module on which a memory that stores a communication control program, a processor that executes the program, and a relevant circuit are integrated. Note that the NFC interface 966 transmits and receives wireless signals via an antenna. The antenna may be included is the terminal on which the wireless communication module 960 is mounted.

Note that the wireless communication module 960 may include one or more antennas (for example, an antenna of the wireless LAN communication scheme, an antenna of the NFC scheme, and the like) without being limited to the example of FIG. 14. In addition, the wireless communication module 960 may include an electromagnetic coil. In addition, one of or both the wireless communication interface 965 and the NFC interface 966 may be included in the terminal on which the wireless communication module 960 is mounted, rather than being included in the wireless communication module 960.

The bus 967 connects the processor 961, the memory 962, the storage 963, the external connection interface 964, the wireless communication interface 965, and the NFC interface 966 to one another.

In a wireless communication module 960 illustrated in FIG. 14, the information acquisition unit 161, the determination unit 163, the determination result acquisition unit 165, and the control unit 167 and 181 that have been described using FIG. 1 and FIG. 9 may be installed in a processor 961. More specifically, for example, fee information acquisition unit 161, the determination unit 163, the determination result acquisition unit 165, and the control unit 167 and 181 may be installed as a program (for example, a portion of an operating system (OS) or a portion of a device driver) that is executed by the processor 961. Furthermore, at least some of the functions of the above may be installed in the wireless communication interface 965 or the NFC interface 966. Furthermore, in the wireless communication module 960 illustrated in FIG. 14, the wireless LAN communication unit 120 and the NFC unit 140 described using FIG. 1 may be installed in the wireless communication interface 965 and the NFC interface 966, respectively.

5. Conclusion

The terminal device and the communication control process according to an embodiment of the present disclosure have been described above using FIGS. 1 to 14. According to the embodiment of the present disclosure, the control unit 167 controls the polling time intervals (in other words, the polling intervals) related to NFC on the basis of the determination result on whether another terminal device having the NFC function is positioned near the terminal device 100. For example, when another terminal device is positioned near the terminal device 100, the control unit 167 controls the polling intervals described above so that, compared with a case in which no other terminal device is positioned near the terminal device 100, the polling intervals described above are shorter.

Accordingly, the polling intervals are shorter when there is a possibility of performing NFC. Accordingly, when either one of the terminal device 100 or another terminal device is brought near the other, transmission and reception of polls between the terminal device 100 and the another terminal device are performed in a short time. As a result, NFC is performed as soon as a user brings the terminal device 100 and another terminal device near each other. Convenience of the user is increased in the above manner. Furthermore, if there is no possibility of performing NFC, the polling intervals become long. Accordingly, consumption of electric power of the terminal device 100 can be suppressed. In other words, while convenience of the user of the terminal device 100 having the NFC function is increased, consumption of electric power of the terminal device 100 can be suppressed.

Furthermore, for example, the determination described above is performed on the basis of information that is provided from another terminal device through wireless LAN communication and that indicates whether the NFC function (in other words, the NFC function information) is available.

With the above, it is possible to know whether another terminal device positioned near the terminal device 100 has NFC.

Furthermore, for example, the NFC function information described above is information included in a beacon or a probe response from another terminal device.

With the above, for example, it is possible to acquire the NFC function information without an addition of a new message.

Furthermore, as an example, the NFC function information described above is information of the supported configuration method.

With the above, for example, it is possible to acquire the NFC function information from existing information.

Furthermore, in the modification of the present embodiment, the generation of the magnetic flux by the magnetic flux generation unit 170 is controlled so that a magnetic flux is generated in a direction in which another terminal device is to be disposed when the another terminal performs NFC with tire terminal device 101 or a magnetic flux is generated in a direction opposite to the above direction. The magnetic flax generation unit 170 includes an electromagnetic coil.

With the above, when another terminal device is positioned near the terminal device 101 and, as described above, when a magnetic field is generated, an electromagnetic force that pulls the center of the electromagnetic coil of the terminal device 101 and the center of the electromagnetic coil of the another terminal device to each other is generated. As a result, for example, the second antenna unit 130 of the terminal device 101 and the antenna of the another terminal device for NFC are positioned so as to face each other, and are positioned close to each other. In other words, the relationship between the position of the NFC antenna of the terminal device 101 and the position of the NFC antenna of the another terminal device is in a positional relationship that is suitable for NFC. As a result, errors in NFC can be reduced.

Furthermore, the size of the magnetic flux generated by the magnetic flux generation unit 170 may be changed according to the size of the antenna of the another terminal device that performs NFC with the terminal device 101.

For example, when, the antenna of the another terminal device is small, it will be more difficult to set the relationship between the position of the antenna and the position of the NFC antenna of the terminal device 101 to have a positional relationship suitable for NFC. However, for example, by generating a larger magnetic flux and generating a larger electromagnetic force, it may be easier to set the positional relationship between the antennas to have a positional relationship suitable for NFC. As a result, for example, regardless of the size of the antenna, errors in NFC can be reduced.

Hereinabove, the exemplary embodiments of the present disclosure have been described with reference to accompanying drawings, however, if is needless to say that the present disclosure is not limited thereto. It should be understood by those skilled in the art, that various modifications, combinations, sub-combinations and alterations may occur depending on design requirements and other factors insofar as they are within the scope of the appended claims or the equivalents thereof.

For example, an example in which near field communication (NFC) is performed has been described as an example of the short range wireless communication; however, the present disclosure is not limited to the example. For example, instead of NFC, a different short range wireless communication may be performed.

Furthermore, the processing steps of the communication control process of the present description do not necessarily have to be executed in time series along the order described in the flowchart. For example, the processing steps of the communication control process may be executed in an order that is different from the order described in the flowchart or may be executed in a parallel manner.

Furthermore, computer programs that exert similar functions as those of the configurations of the terminal device described above may be made in hardware such as a CPU, a ROM, a RAM that are built in the terminal device. Furthermore, a storage medium in which the computer programs are stored may also be provided. Furthermore, memories (for example, a ROM and a RAM) that store the computer programs and an information processing device (for example, a processing circuit or a chip) including a processor (for example, a CPU) that executes the computer programs may also be provided.

In addition, the effects disclosed in the specification are not invariably determinative, but descriptive or exemplary. In other words, the technology of the present disclosure can exhibit other effects that are obvious to those skilled in the art based on the present disclosure of the specification, along with or instead of the effects described above.

Additionally, the present technology may also be configured as below.

(1)

A terminal device including:

an acquisition unit configured to acquire a result of determination of whether another terminal device that has a function for short range wireless communication is positioned near the terminal device; and a control unit configured to, on the basis of the result of the determination, control a time interval of polling related to the short range wireless communication.

(2)

The terminal device according to (1), wherein the control unit controls the time interval in a manner that, when there is another terminal device positioned near the terminal device, the time interval is shorter than the time interval when there is no other terminal device positioned near the terminal device.

(3)

The terminal device according to (1) or (2), wherein the control unit controls the time interval by outputting a command for setting the time interval.

(4)

The terminal device according to (3), wherein the command is a command that makes a module having a function for the short range wireless communication update a register that stores the time interval.

(5)

The terminal device according to (1), wherein the short range wireless communication is near field communication (NFC).

(6)

The terminal device according to (5), wherein the near field communication is wireless communication that conforms to either of ISO/EEC 14443 Type A, ISO/IEC 14443 Type B, ISO/IEC 1S693, ISO/IEC 18092, and ISO/IEC 21481.

(7)

The terminal device according to any one of (1) to (6), further including a short range wireless communication unit configured to perform the short range wireless communication.

(8)

The terminal device according to any one of (1) to (7), wherein the determination is performed on the basis of information that is information provided from another terminal device through, wireless communication that has a communication range that is wider than a communication range of the short range wireless communication and that is information indicating whether the function for the short range wireless communication is available.

(9)

The terminal device according to (8), wherein the wireless communication is wireless local area network (LAN) communication.

(10)

The terminal device according to (9), wherein the wireless local area network communication is wireless communication that conforms to IEEE 802.11.

(11)

The terminal device according to (9), wherein the information indicating whether the function for the short range wireless communication is available is information included in a beacon or a probe response from another terminal device.

(12)

The terminal device according to any one of (9) to (11), wherein the information indicating whether the function for the short range wireless communication is available is information of a supported configuration method.

(13)

The terminal device according to any one of (8) to (12), further including a determination unit configured to perform the determination.

(14)

The terminal device according to any one of (8) to (13), further including a wireless communication unit configured to perform the wireless communication.

(15)

The terminal device according to any one of (1) to (14), further including a magnetic flux generation unit configured to generate a magnetic flux, wherein the control unit controls generation of the magnetic flux by the magnetic flux generation unit in a manner that a magnetic flux is generated in a direction in which another terminal device is to be disposed when the another terminal device performs the short range wireless communication with the terminal device or in a manner that a magnetic flux is generated in a direction opposite to the direction.

(16)

The terminal device according to (15), wherein the magnetic flux generation unit includes an electromagnetic coil.

(17)

The terminal device according to (15) or (16), wherein the control unit changes a size of the magnetic flux generated by the magnetic flux generation unit according to a size of an antenna of another terminal device that performs the short range wireless communication with the terminal device.

(18)

The terminal device according to any one of (1) to (17), wherein the function for the short range wireless communication includes a reader/writer for the short range wireless communication or a tag for the short range wireless communication.

(19)

A program for causing a processor configured to control a terminal device to execute processing of:

acquiring a result of determination of whether another terminal device that has a function for short range wireless communication is positioned near the terminal device; and controlling, on the basis of the result of the determination, a time interval of polling related to the short range wireless communication.

(20)

An information processing device that controls a terminal device, the information processing device including:

one or more processors; and a memory configured to store a program that is executed by the one or more processors, wherein the program is configured to execute processing of acquiring a result of determination of whether another terminal device that has a function for short range wireless communication is positioned near the terminal device, and controlling, on the basis of the result of the determination, a time interval of polling related to the short range wireless communication.

REFERENCE SIGNS LIST 20 terminal device
100, 101 terminal device
120 wireless local area network (LAN) communication unit
140 near field communication (NFC) unit
163 determination unit
165 determination result acquisition unit
167, 181 control unit
170 magnetic flux generation unit
171 electromagnetic coil

The invention claimed is:

1. A first terminal device, comprising:
a wireless communication unit configured to receive information from a second terminal device via wireless communication,
wherein the information indicates availability of a function for short range wireless communication in the second terminal device;
a determination unit configured to determine one of a first position of the second terminal device or a second position of the second terminal device,
wherein the first position is within a distance range, of the first terminal device, for the short range wireless communication with the first terminal device, and
wherein the second position is outside the distance range, of the first terminal device, for the short range wireless communication with the first terminal device; and
a control unit configured to set a time interval of polling that corresponds to the short range wireless communication,
wherein the time interval of polling is set to a first value based on the first position, of the second terminal device, that is within the distance range of the first terminal device for the short range wireless communication,
wherein the time interval of polling is set to a second value based on the second position, of the second terminal device, that is outside the distance range from the first terminal device for the short range wireless communication, and
wherein the second value is shorter than the first value.

2. The first terminal device according to claim 1, wherein the control unit is further configured to set the time interval based on a command to set the time interval.

3. The first terminal device according to claim 2, further comprising:
a register configured to store the time interval; and
a module that comprises the function for the short range wireless communication,
wherein the command is configured to update the register through the module.

4. The first terminal device according to claim 1, wherein the short range wireless communication is near field communication (NFC).

5. The first terminal device according to claim 4, wherein the near field communication is based on at least one of ISO/IEC 14443 Type A, ISO/IEC 14443 Type B, ISO/IEC 15693, ISO/IEC 18092, or ISO/IEC 21481.

6. The first terminal device according to claim 1, further comprising a short range wireless communication unit configured to communicate with the second terminal device through the short range wireless communication.

7. The first terminal device according to claim 1,
wherein a first communication range of the wireless communication is wider than a second communication range of the short range wireless communication.

8. The first terminal device according to claim 1, wherein the wireless communication is wireless local area network (LAN) communication.

9. The first terminal device according to claim 8, wherein the wireless local area network (LAN) communication is based on IEEE 802.11.

10. The first terminal device according to claim 8,
wherein the wireless communication unit is further configured to receive one of a beacon or a probe response from the second terminal device, and
wherein one of the beacon or the probe response comprises the information that indicates the availability of the function for the short range wireless communication in the second terminal device.

11. The first terminal device according to claim 8, wherein the information is for a supported configuration method.

12. The first terminal device according to claim 1, wherein the wireless communication unit is configured to communicate, with the second terminal device, via the wireless communication.

13. The first terminal device according to claim 1, further comprising a magnetic flux generation unit configured to generate a magnetic flux,
wherein the control unit is further configured to control the generation of the magnetic flux such that the magnetic flux is generated in one of:
a first direction, wherein the second terminal device is present in the first direction, or
a second direction that is opposite to the first direction.

14. The first terminal device according to claim 13, wherein the magnetic flux generation unit includes an electromagnetic coil.

15. The first terminal device according to claim 13, wherein the control unit is further configured to change, a surface area of the generated magnetic flux, based on a size of an antenna of the second terminal device that communicates with the first terminal device via the short range wireless communication.

16. The first terminal device according to claim 1, wherein the function for the short range wireless communication includes at least one of:
a reader/writer for the short range wireless communication, or
a tag for the short range wireless communication.

17. A non-transitory computer-readable medium having stored thereon computer-executable instructions that, when executed by a first terminal device, cause the first terminal device to execute operations, the operations comprising:
receiving information from a second terminal device via wireless communication,
wherein the information indicates availability of a function for short range wireless communication in the second terminal device;
determining one of a first position of the second terminal device or a second position of the second terminal device,
wherein the first position is within a distance range, of the first terminal device, for the short range wireless communication with the first terminal device, and
wherein the second position is outside the distance range, of the first terminal device, for the short range wireless communication with the first terminal device; and
setting a time interval of polling that corresponds to the short range wireless communication,
wherein the time interval of polling is set to a first value based on the first position, of the second terminal device, that is within the distance range of the first terminal device for the short range wireless communication,
wherein the time interval of polling is set to a second value based on the second position, of the second terminal device, that is outside the distance range from the first terminal device for the short range wireless communication, and
wherein the second value is shorter than the first value.

18. An information processing device, comprising:
one or more processors; and
a memory configured to store instructions for execution by the one or more processors,
wherein the one or more processors is configured to:
control a first terminal device;
receive information from a second terminal device via wireless communication,
wherein the information indicates availability of a function for short range wireless communication in the second terminal device;
determine one of a first position of the second terminal device or a second position of the second terminal device,
wherein the first position is within a distance range, of the first terminal device, for the short range wireless communication with the first terminal device, and
wherein the second position is outside the distance range, of the first terminal device, for the short range wireless communication with the first terminal device; and
set, a time interval of polling that corresponds to the short range wireless communication,
wherein the time interval of polling is set to a first value based on the first position, of the second terminal device, that is within the distance range of the first terminal device for the short range wireless communication, wherein the time interval of polling is set to a second value based on the second position, of the second terminal device, that is outside the distance range from the first terminal device for the short range wireless communication, and wherein the second value is shorter than the first value.

* * * * *